United States Patent
Kishiyama

(10) Patent No.: US 11,212,047 B2
(45) Date of Patent: *Dec. 28, 2021

(54) RECEIVER, TRANSMITTER AND RADIO COMMUNICATION METHOD

(71) Applicant: NTT DOCOMO, INC., Chiyoda-ku (JP)

(72) Inventor: Yoshihisa Kishiyama, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/295,024

(22) Filed: Mar. 7, 2019

(65) Prior Publication Data

US 2019/0207726 A1    Jul. 4, 2019

Related U.S. Application Data

(62) Division of application No. 14/009,534, filed as application No. PCT/JP2012/062647 on May 17, 2012, now abandoned.

(30) Foreign Application Priority Data

May 20, 2011  (JP) .................................. 2011-114032
Oct. 14, 2011  (JP) .................................. 2011-227149

(51) Int. Cl.
*H04L 5/00*          (2006.01)
*H04B 17/336*     (2015.01)
(Continued)

(52) U.S. Cl.
CPC ........... *H04L 5/0014* (2013.01); *H04B 1/123* (2013.01); *H04B 17/336* (2015.01); *H04J 11/004* (2013.01); *H04W 52/143* (2013.01)

(58) Field of Classification Search
None
See application file for complete search history.

(56) References Cited

U.S. PATENT DOCUMENTS 8,179,876 B2 *  5/2012  Agrawal ............. H04L 27/0008
                                                            370/343
2002/0051433 A1    5/2002  Affes
(Continued)

FOREIGN PATENT DOCUMENTS

JP      2009-10752       1/2009
JP      2009-111995      5/2009
(Continued)

OTHER PUBLICATIONS

"Non-Orthogonal Multiple Access (NOMA) for Cellular Future Radio Access", 2013 IEEE 77th Vehicular Technology Conference (VTC Spring), Jun. 2-5, 2013 (Year: 2013).*
"H-ARQ Based Non-Orthogonal Multiple Access with Successive Interference Cancellation", IEEE Globecom 2008—2008 IEEE Global Telecommunications Conference, Nov. 30.-Dec. 4, 2008 (Year: 2008).*
(Continued)

*Primary Examiner* — Scott M Sciacca
(74) *Attorney, Agent, or Firm* — Oblon, McClelland, Maier & Neustadt, L.L.P.

(57) ABSTRACT

Provided are a receiver, a transmitter and a radio communication method capable of using non-orthogonal multiple access while suppressing cost increase and processing delay. A mobile station 200A includes a target user control signal detector 230 and an interfering user control signal detector 240 which are configured to receive a control signal to be used to cancel a non-orthogonal signal by interference canceller. The control signal includes control information containing a radio resource block allocated to the non-orthogonal signal addressed to another mobile station. The mobile station 200A demodulates and cancels the radio signal addressed to the other mobile station on the basis of the control signal.

5 Claims, 10 Drawing Sheets

(51) Int. Cl.
*H04B 1/10* (2006.01)
*H04B 1/7107* (2011.01)
*H04B 1/12* (2006.01)
*H04J 11/00* (2006.01)
*H04W 52/14* (2009.01)

(56) References Cited

U.S. PATENT DOCUMENTS

| | | |
|---|---|---|
| 2003/0174675 A1 | 9/2003 | Willenegger et al. |
| 2004/0028013 A1 | 2/2004 | Fitton |
| 2005/0250506 A1 | 11/2005 | Beale |
| 2007/0060167 A1* | 3/2007 | Damnjanovic ....... H04W 52/02 455/450 |
| 2007/0291634 A1 | 12/2007 | Kwon |
| 2008/0062857 A1* | 3/2008 | Monogioudis ...... H04L 27/2627 370/208 |
| 2010/0046644 A1* | 2/2010 | Mazet ................ H04L 27/3488 375/260 |
| 2010/0098006 A1 | 4/2010 | Von Elbwart |
| 2010/0111226 A1 | 5/2010 | Ko et al. |
| 2010/0118783 A1 | 5/2010 | Baker et al. |
| 2010/0246711 A1 | 9/2010 | Kishigami et al. |
| 2010/0290548 A1 | 11/2010 | Hoshino et al. |
| 2010/0303162 A1 | 12/2010 | Wang et al. |
| 2011/0105107 A1 | 5/2011 | Kwon et al. |
| 2012/0281683 A1 | 11/2012 | Falconetti |
| 2013/0155868 A1 | 6/2013 | Seo et al. |

FOREIGN PATENT DOCUMENTS

| | | |
|---|---|---|
| JP | 5864199 | 2/2016 |
| WO | 2009/081514 | 7/2009 |

OTHER PUBLICATIONS

European Office Action dated May 3, 2019 in Patent Application No. 12 789 588.6, 5 pages.
Kishiyama Y. et al., "Initial Views on Non-orthogonal Multiple Access Based Radio Interface for Future Radio Access", IEICE, pp. 37 to 42, Jul. 14, 2011 (w/English translation).
Tse D. et al. "Fundamentals of Wireless Communication" Cambridge University Press, (Total 584 pages), (2005).
International Search Report dated Aug. 7, 2012 in PCT/JP12/062647 filed May 17, 2012.
Extended European Search Report dated Nov. 6, 2014, in Patent Application No. 12789588.6.
Krishna Balachandran, et al., "NICE: A Network Interference Cancellation Engine for Opportunistic Uplink Cooperation in Wireless Networks", IEEE Transactions On Wireless Communications, vol. 10, No. 2, XP 011348273, Feb. 2011, pp. 540-549.
Catt, et al., "Considerations on Enhanced SRS Transmission Schemes", 3GPP TSG RAN WG1 Meeting #59bis, R1-100023, XP050417779, Jan. 18-22, 2010, 4 pages.
Catt, "On transparency of MU-MIMO in LTE-A", 3GPP TSG RAN WG1 Meeting #59bis, R1-100074, XP 050417817, Jan. 18-22, 2010, 3 pages.
Office Action dated Jun. 30, 2015, in Japanese Patent Application No. 2011-227149 (w/English-language translation).
Schaepperle et al., "Enhancement of Throughput and Fairness in 4G Wireless Access Systems by Non-Orthogonal Signaling," Bell Labs Technical Journal 13(4), pp. 59-78, 2009.
Office Action dated Oct. 18, 2016, in Japanese Patent Application No. 2015-250097 (w/English-language translation).
European Office Action dated Mar. 17, 2021 in European Patent Application No. 12 789 588.6, 7 pages.

* cited by examiner

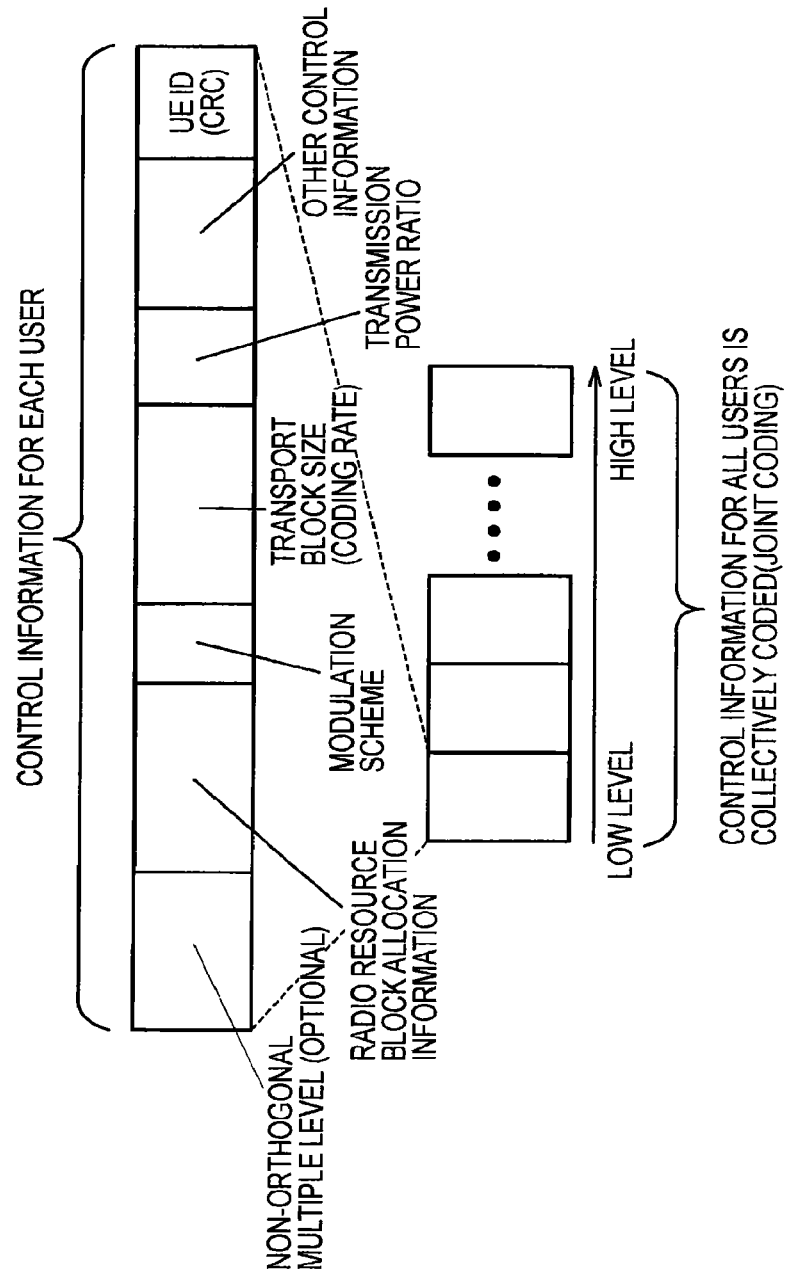

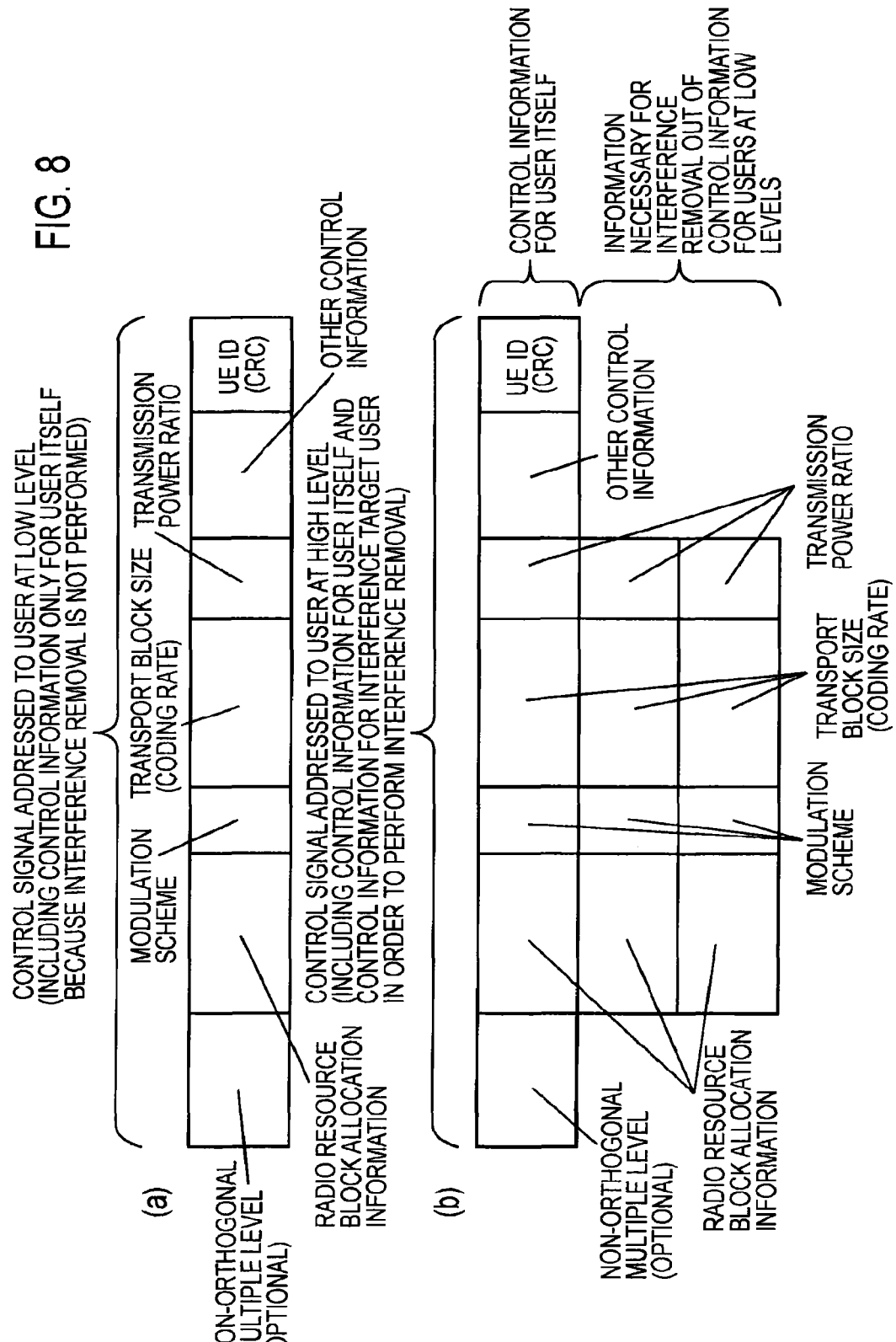

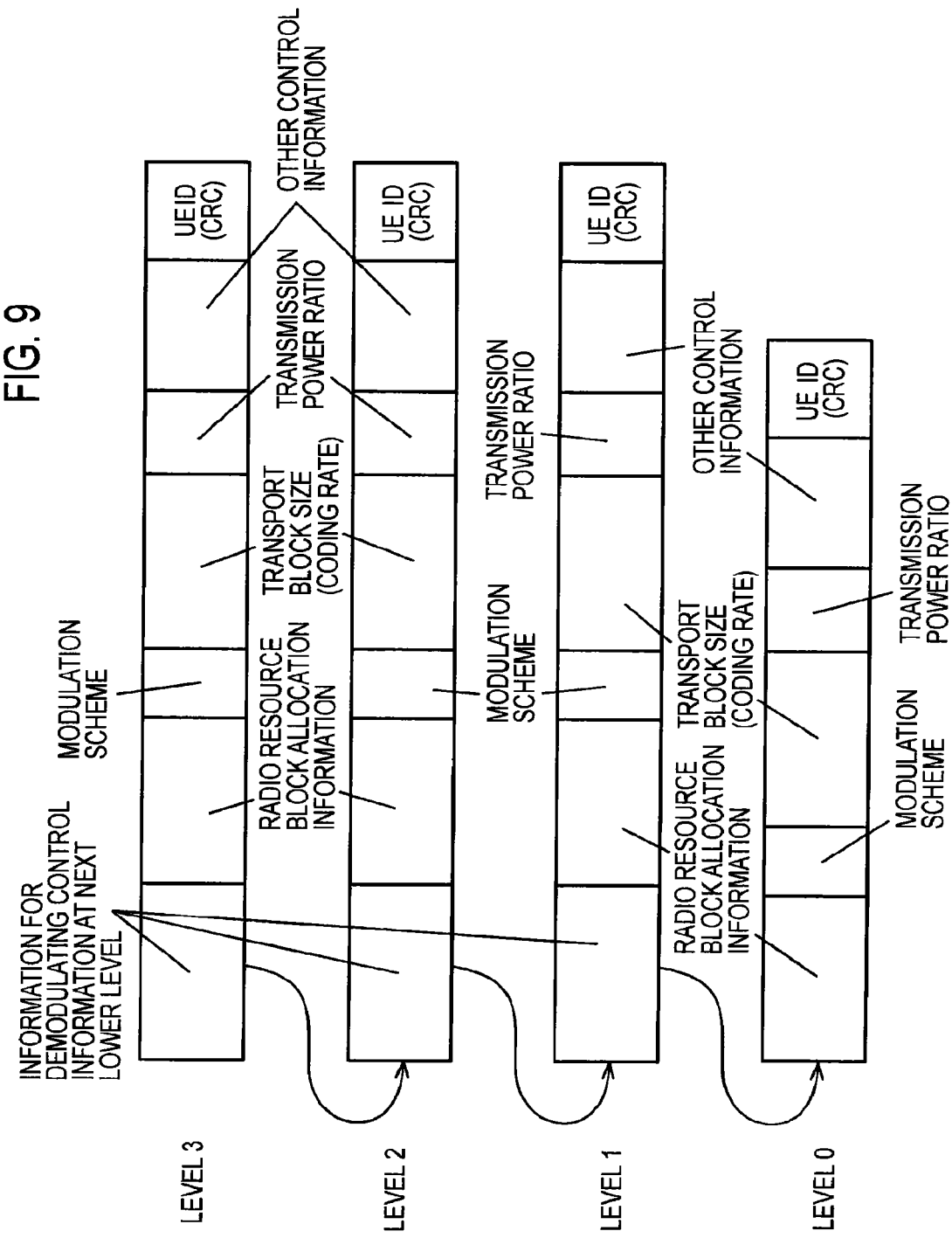

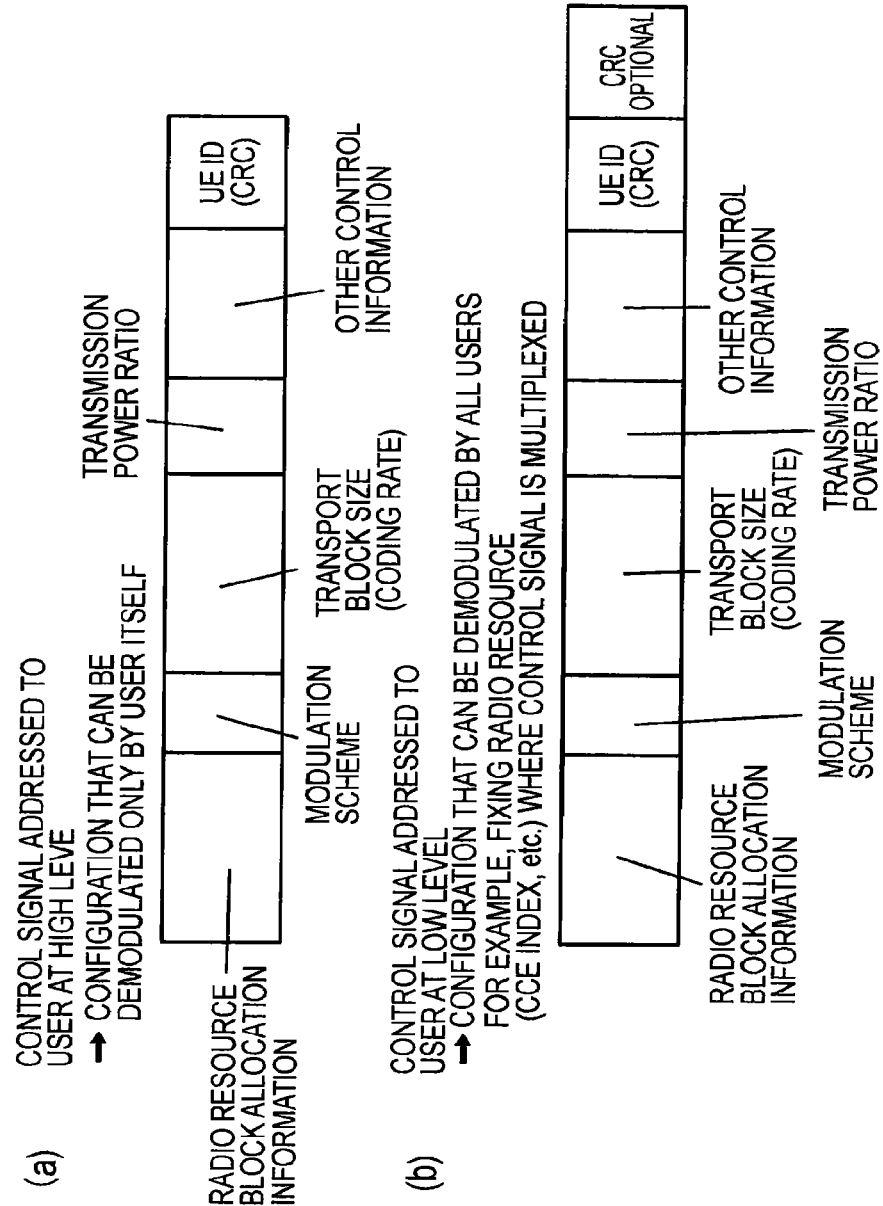

RECEIVER, TRANSMITTER AND RADIO COMMUNICATION METHOD

CROSS-REFERENCE TO RELATED APPLICATIONS

This application is a division of and claims the benefit of priority under 35 U.S.C. § 120 from U.S. application Ser. No. 14/009,534 filed Oct. 3, 2013, the entire contents of which are incorporated herein by reference. U.S. application Ser. No. 14/009,534 is a National Stage of PCT/JP12/62647 filed May 17, 2012, which claims the benefit for priority under 35 U.S.C. § 119 from Japanese Application No. 2011-114032 filed May 20, 2011 and Japanese Application No. 2011-227149 filed Oct. 14, 2011.

TECHNICAL FIELD

The present invention relates to a receiver, a transmitter and a radio communication method which are adapted to non-orthogonal multiple access.

BACKGROUND ART

Mobile communication systems, for example, Long Term Evolution (LTE) standardized by the 3GPP, widely use orthogonal multiple access in which multiple orthogonal signals not interfering with each other are used between a base station and user terminals (mobile stations). On the other hand, there has been proposed non-orthogonal multiple access using non-orthogonal signals to increase the capacity of a mobile communication system (for example, see Non-patent document 1).

The non-orthogonal multiple access is based on the premise of signal separation (interference canceller) through non-linear signal processing. For example, in the case of downlink, abase station concurrently transmits non-orthogonal signals to multiple user terminals. Each of the user terminals performs signal processing to remove, from the received non-orthogonal signals, a signal addressed to a user terminal (at a cell edge) having a larger path loss than the user terminal itself, and then demodulates the resultant signal.

PRIOR ART DOCUMENT

Non-Patent Document

Non-patent document 1: D. Tse and P. Viswanath, "Fundamentals of Wireless Communication", Cambridge University Press, 2005, <http://www.eecs.berkeley.edu/ to dtse/book.html> on the Internet.

SUMMARY OF THE INVENTION

As described above, in the case of non-orthogonal multiple access, each user terminal, i.e., each mobile station needs to perform demodulation after signal processing of removing the signal addressed to a mobile station having a larger path loss than the mobile station itself. For this reason, the processing load in the mobile station is so high that problems of cost increase and processing delay of the mobile station may occur. A possible solution to these problems is to introduce hybrid orthogonal/non-orthogonal multiple access in which orthogonal multiple access and non-orthogonal multiple access are used in combination. With this introduction, the problems of cost increase and processing delay of the mobile station can be expected to reduce to some degree.

In the implementation point of view, however, it is preferable that each mobile station be able to recognize the conditions of mobile stations multiplexed in non-orthogonal multiple access in order to achieve further cost and processing delay reductions.

Therefore, the present invention has been made in consideration of the above circumstances, and has an objective to provide a receiver, a transmitter, and a radio communication method capable of using non-orthogonal multiple access while suppressing cost increase and processing delay.

In summary, a first feature of the present invention is a receiver (for example, a mobile station 200A) including: a radio signal reception unit (physical channel segmentation unit 210) configured to receive radio signals including multiple non-orthogonal signals which are not orthogonal to each other; an interference cancellation unit (data demodulating/decoding units 220) configured to extract the non-orthogonal signal addressed to the receiver from the multiple non-orthogonal signals received by the radio signal reception unit, by demodulating and cancelling the radio signal addressed to another receiver; a control signal reception unit (a target user control signal detector 230 and an interfering user control signal detector 240) configured to receive a control signal to be used by the interference cancellation unit to demodulate and cancel the radio signal; and a demodulation unit (the data demodulating/decoding units 220) configured to demodulate the signal extracted by the interference cancellation unit and addressed to the receiver. The control signal includes control information containing a radio resource block allocated to the non-orthogonal signal addressed to the other receiver. The interference cancellation unit demodulates and cancels the radio signal addressed to the other receiver on the basis of the control information.

In summary, a second feature of the present invention is a transmitter (base station 100) including: a radio signal transmission unit (a hybrid orthogonal/non-orthogonal multiplexer 130 and a physical channel multiplexer 160) configured to transmit radio signals to multiple receivers located within a cell, the radio signals including multiple non-orthogonal signals which are not orthogonal to each other; and a control signal transmission unit (a control signal generator 140, a control signal resource allocator 150 and a physical channel multiplexer 160) configured to transmit a control signal to the multiple receivers, the control signal being to be used by any of the receivers to demodulate and cancel the radio signal addressed to another one of the receivers from the multiple received non-orthogonal signals. The control signal includes control information containing a radio resource block allocated to the non-orthogonal signal addressed to the other receiver.

In summary, a third feature of the present invention is a radio communication method including the steps of: receiving, by a communication device, radio signals including multiple non-orthogonal signals which are not orthogonal to each other; receiving, by the communication device, a control signal to be used to demodulate and cancel the radio signal addressed to another receiver from the received multiple non-orthogonal signals; demodulating and cancelling the radio signal addressed to the other receiver by the communication device; and demodulating, by the communication device, the signal extracted by the cancelling step and addressed to the communication device. The control signal includes control information containing a radio resource block allocated to the non-orthogonal signal addressed to the other receiver. In the step of cancelling the non-orthogonal signal, the radio signal addressed to the other receiver is demodulated and cancelled on the basis of the control information.

BRIEF DESCRIPTION OF THE DRAWINGS

FIG. 7 is a diagram illustrating a configuration example 1 of a control signal according to the embodiment of the present invention.

FIG. 8 is a diagram illustrating a configuration example 2 of a control signal according to the embodiment of the present invention.

FIG. 9 is a diagram illustrating a configuration example 3 of a control signal according to the embodiment of the present invention.

FIG. 10 is a diagram illustrating a configuration example 4 of a control signal according to the embodiment of the present invention.

MODES FOR CARRYING OUT THE INVENTION

Figure 1:
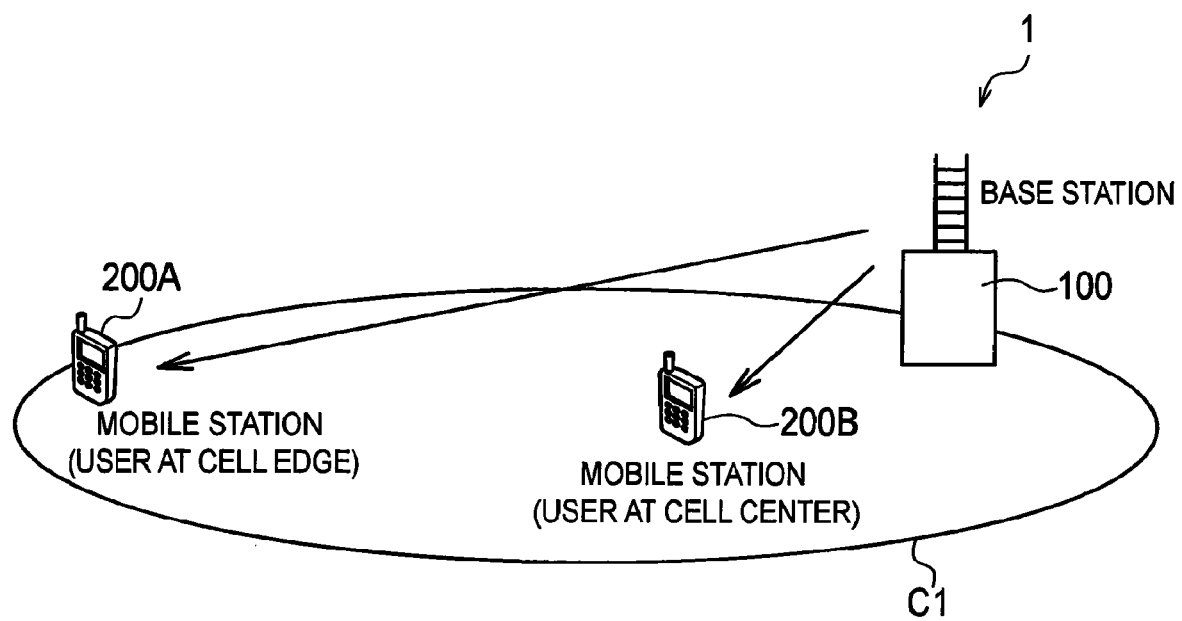
FIG. 1 is a diagram of an overall schematic configuration of a mobile communication system 1 according to an embodiment.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

FIG. 1 is a diagram of an overall schematic configuration of a mobile communication system 1 according to this embodiment. As illustrated in FIG. 1, the mobile communication system 1 includes a base station 100 and mobile stations 200A, 200B.

The base station 100 transmits radio signals to the mobile stations 200A, 200B, more specifically to the inside of a cell C1. In addition, the base station 100 receives radio signals from the mobile stations 200A, 200B. In this embodiment, the base station 100 configures a transmitter and the mobile stations 200A, 200B each configure a receiver.

The mobile station 200A is located within the cell C1 but is located at a cell edge of the cell C1 where a path loss of a radio signal from the base station 100 is large. The mobile station 200B is located in the center within the cell C1. For this reason, the path loss of a radio signal from the base station 100 in the mobile station 200B is smaller than the path loss in the mobile station 200A.

In this embodiment, the base station 100 transmits radio signals to the mobile stations 200A, 200B located in the cell C1, the radio signals including multiple orthogonal signals that are orthogonal to each other, and multiple non-orthogonal signals that are not orthogonal to each other. In other words, the mobile communication system 1 uses a combination of orthogonal multiple access for implementing concurrent communications with multiple mobile stations using orthogonal signals, and non-orthogonal multiple access for implementing concurrent communications with the multiple mobile stations using non-orthogonal signals (hereinafter referred to as hybrid orthogonal/non-orthogonal multiple access).

Figure 2:
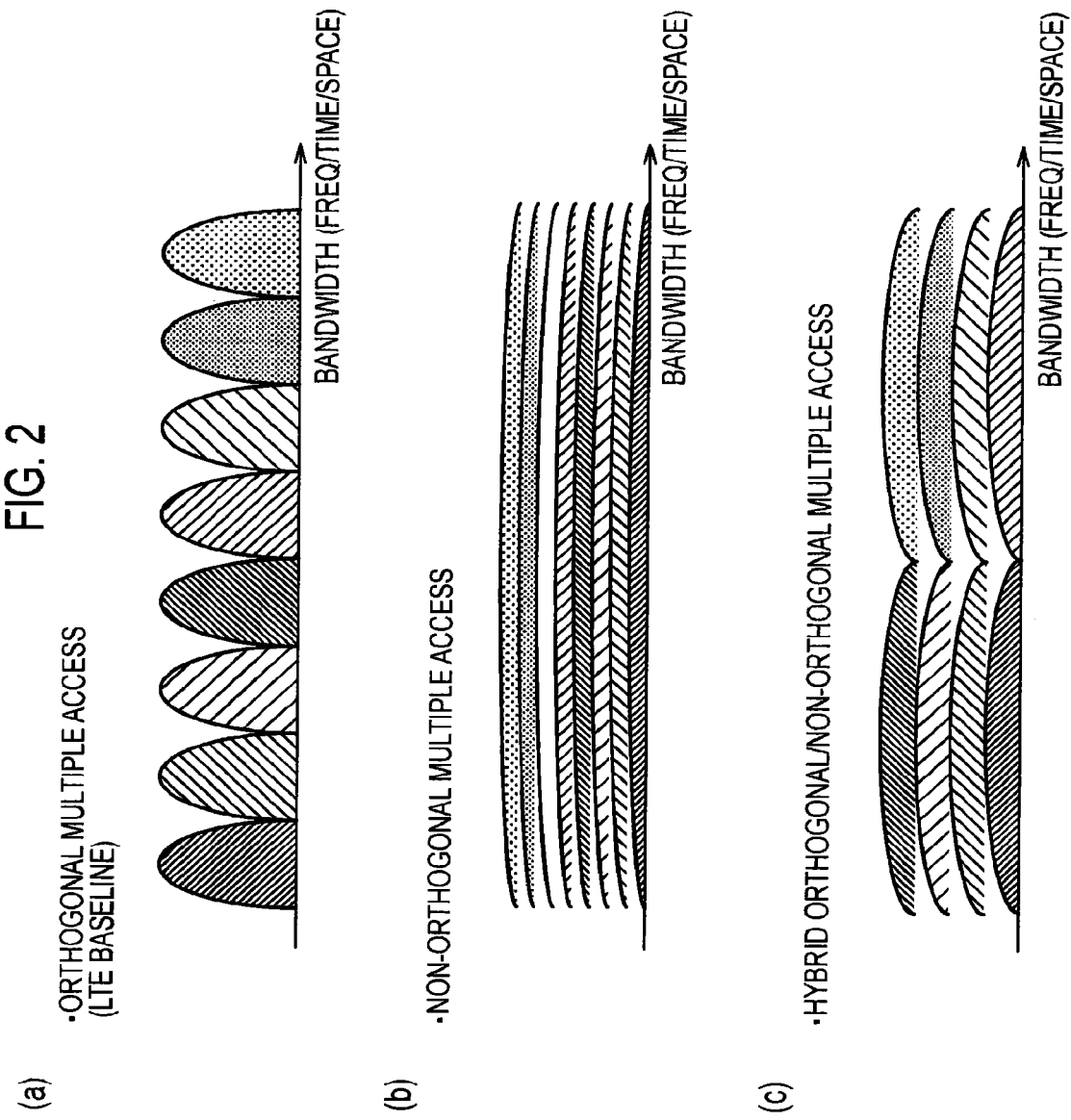
FIG. 2 is a diagram illustrating radio resource allocation images in orthogonal multiple access, non-orthogonal multiple access, and hybrid orthogonal/non-orthogonal multiple access.

Parts (a) to (c) of FIG. 2 illustrate radio resource allocation images in the orthogonal multiple access, the non-orthogonal multiple access, and the hybrid orthogonal/non-orthogonal multiple access. As illustrated in part (a) of FIG. 2, in the orthogonal multiple access, radio resources allocated to mobile stations (users) do not overlap each other in the bandwidth in a frequency domain/time domain/space domain. For this reason, in principle, the orthogonal multiple access does not need to remove interferences from the radio resources allocated to the other mobile stations. The orthogonal multiple access is also used in Long Term Evolution (LTE) standardized by the 3GPP.

As illustrated in part (b) of FIG. 2, in the non-orthogonal multiple access, radio resources allocated to mobile stations (users) overlap each other in the bandwidth mentioned above. For this reason, each mobile station needs to remove all the multiple access interferences through signal processing. The specific signal processing therefor can use the technique described in Non-patent document 1 mentioned above.

As illustrated in part (c) of FIG. 2, in the hybrid orthogonal/non-orthogonal multiple access, radio resources allocated to mobile stations (users) partly overlap each other in the bandwidth mentioned above. For this reason, each mobile station only has to remove multiple access interferences of a prescribed number or less according to the number of multiplexed radio resources.

This embodiment reduces a signal processing load associated with removal of multiple access interferences by introducing the aforementioned hybrid orthogonal/non-orthogonal multiple access, and specifies a radio interface enabling a mobile station to recognize the number of multiple access interferences to be removed.

(2) Functional Block Configuration

Figure 3:
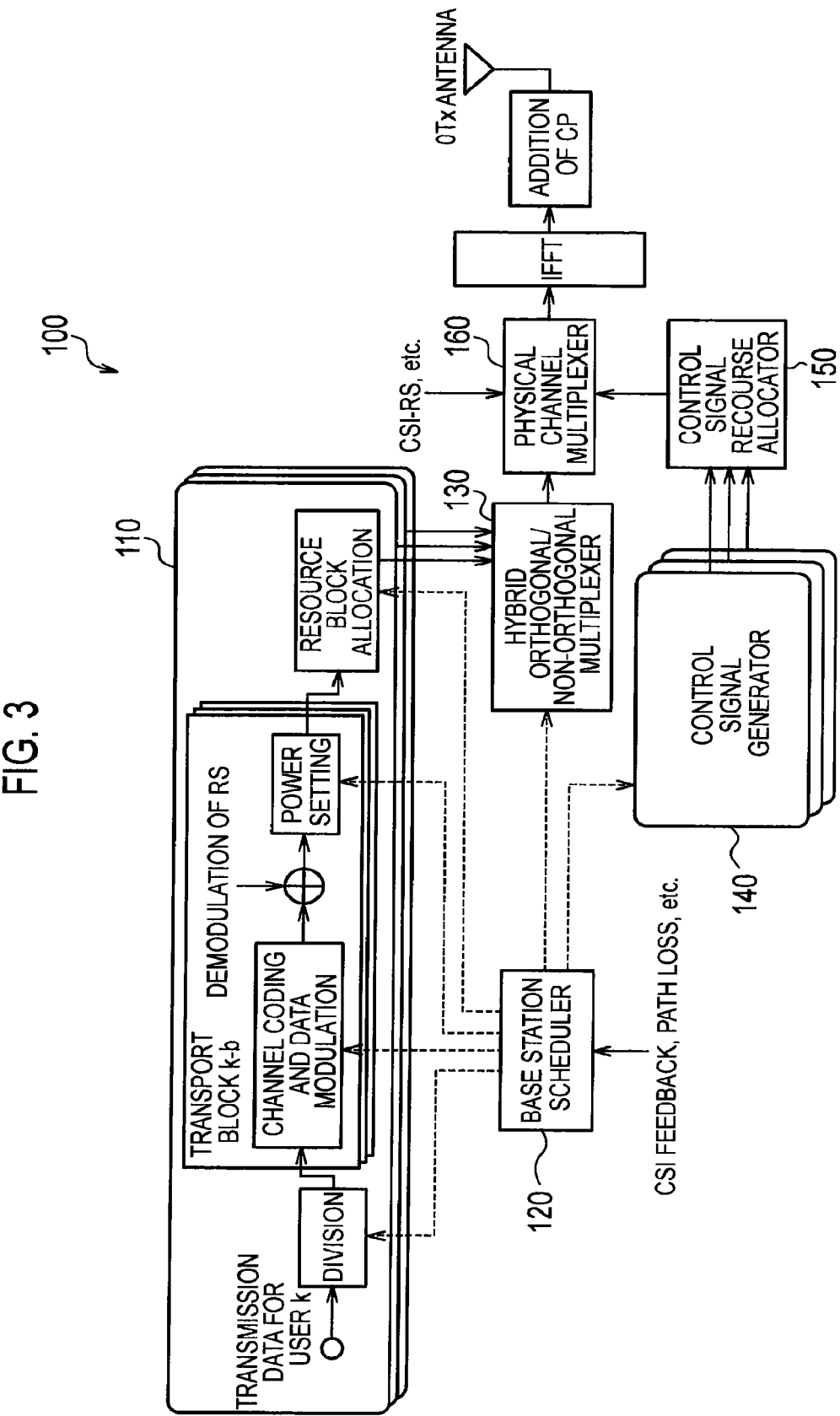
FIG. 3 is a diagram of a functional block configuration of a transmission unit of a base station 100 according to the embodiment of the present invention.
Figure 4:
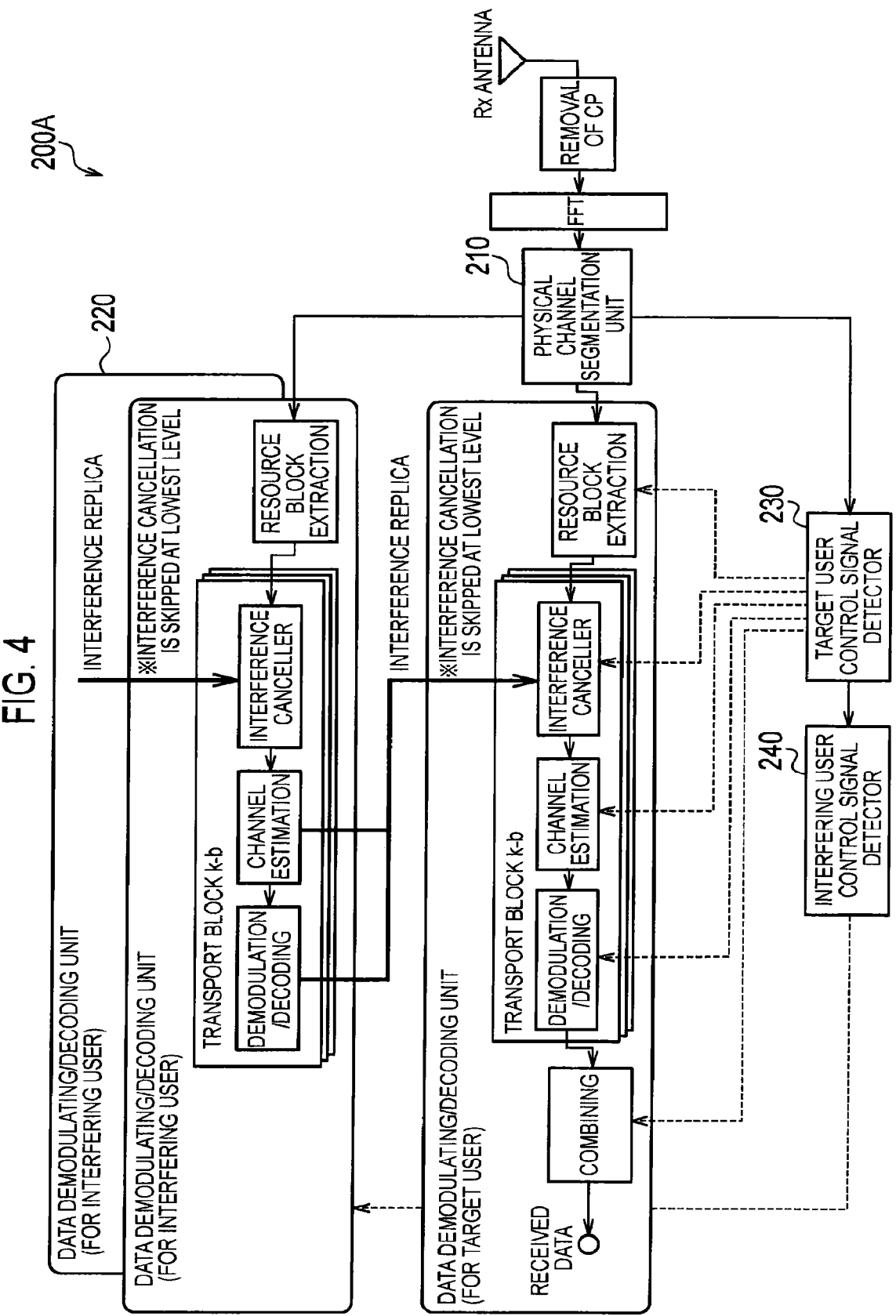
FIG. 4 is a diagram of a functional block configuration of a reception unit of a mobile station 200A according to the embodiment of the present invention.

Next, a functional block configuration of the mobile communication system 1 is described. FIG. 3 is a diagram of a functional block configuration of a transmission unit of the base station 100. FIG. 4 is a diagram of a functional block configuration of a reception unit of the mobile station 200A.

(2.1) Base Station 100

As illustrated in FIG. 3, a transmission unit of the base station 100 includes coding/data modulating units 110, a base station scheduler 120, a hybrid orthogonal/non-orthogonal multiplexer 130, a control signal generator 140, a control signal resource allocator 150 and a physical channel multiplexer 160.

The coding/data modulating units 110 perform division of transmission data, channel coding/data modulation, transmission power setting, and resource block allocation for their respective predetermined users (user k). In this embodiment, in particular, the coding/data modulating units 110 allocate radio resource blocks to orthogonal signals and non-orthogonal signals included in radio signals to be transmitted to the mobile stations 200A, 200B.

The base station scheduler 120 controls the coding/data modulating units 110, the hybrid orthogonal/non-orthogonal multiplexer 130 and the control signal generator 140 on the basis of information such as feedbacks of Circuit State Information (CSI) from the mobile stations 200A, 200B, and the path loss between the base station 100 and each of the mobile stations 200A, 200B.

In this embodiment in particular, the base station scheduler 120 schedules signals multiplexed as non-orthogonal signals for multiple mobile stations (for example, the mobile stations 200A, 200B), on the basis of the path losses of the signals multiplexed as non-orthogonal signals to the respective multiple mobile stations, in such a way that the signals can have a large difference in the path loss among them.

Figure 5:
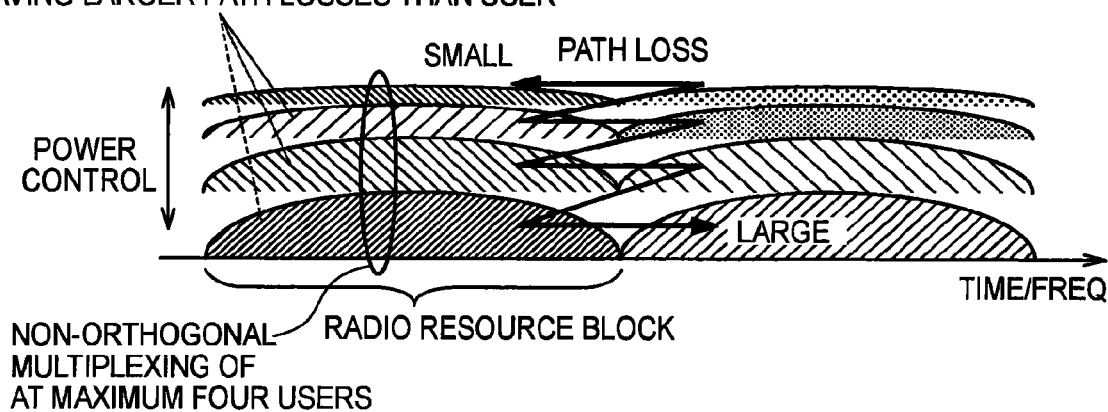
FIG. 5 is a diagram illustrating an example of scheduling of non-orthogonal signals for mobile stations in the base station 100 according to the embodiment of the present invention.

FIG. 5 illustrates an example of scheduling of non-orthogonal signals for mobile stations in the base station 100. The example illustrated in FIG. 5 uses non-orthogonal signals with which at maximum four users (mobile stations) are multiplexed. As illustrated in FIG. 5, in the case of non-orthogonal signals, multiple signals are not orthogonal to each other, in other words, the same radio resource block in the frequency domain or time domain is allocated to the multiple signals.

In this embodiment, signals are multiplexed as non-orthogonal signals sequentially from a signal addressed to a mobile station having the smallest path loss to a signal addressed to a mobile station having the largest path loss. A signal addressed to a mobile station having a small path loss only needs low transmission power to surely obtain a desired SNR, and therefore accounts for a small share in a vertical axis (transmission power) direction in FIG. 5. On the other hand, a signal addressed to a mobile station having a large path loss needs high transmission power to surely obtain a desired SNR, and therefore accounts for a large share in the vertical axis (transmission power) direction in FIG. 5.

In the case of using such non-orthogonal signals, for example, the user (mobile station) having the second smallest path loss needs to remove interferences from the signals allocated to the two mobile stations having the larger path losses than the user (see explanation in the drawing).

Note that, the example illustrated in FIG. 5 also uses orthogonal signals to which different radio resource blocks in the frequency domain and time domain are allocated, i.e., multiple signals orthogonal to each other. Since the aforementioned interference does not occur between the orthogonal signals, the mobile stations do not have to remove the interference.

The hybrid orthogonal/non-orthogonal multiplexer 130 multiplexes the orthogonal signals and the non-orthogonal signals. Specifically, the hybrid orthogonal/non-orthogonal multiplexer 130 multiplexes signals (radio resource blocks) outputted from the multiple coding/data modulating units 110 under the control of the base station scheduler 120. As a result, the multiplexed signals as illustrated in FIG. 5 are generated.

The control signal generator 140 generates various kinds of control signals to be broadcasted to the mobile stations 200A, 200B. In this embodiment, in particular, the maximum number of signals multiplexed as non-orthogonal signals (for example, quad multiplexing) is known to the base station 100 and the mobile stations 200A, 200B. The control signal generator 140 generates a control signal necessary for a mobile station to demodulate and cancel radio signals addressed to other mobile stations (other devices).

The control signal generator 140, for example, can generate a signal including the following control information or reference signal in order for the mobile station to demodulate and cancel radio signals addressed to other mobile stations (other devices):

(a) information indicating the number (including 0 or 1) of multiple access interferences to be removed by a user (mobile station);

(b) information indicating the conditions (such as allocated radio resource block, modulation scheme and channel coding rate) of other users, which are needed by the user (mobile station) to remove multiple access interferences;

(c) a reference signal necessary for coherent demodulation in the user (mobile station); and (d) information (transport block, definition of a radio resource block, transmission power control, feedback control signal, and the like) necessary for allocation of radio resource blocks in the hybrid orthogonal/non-orthogonal multiple access.

The control signal generator 140 may generate a control signal including any one or any combination of the above (a) to (d). The control signal generator 140 transmits the generated control signal to the mobile stations 200A, 200B via the control signal resource allocator 150 and the physical channel multiplexer 160.

In this embodiment, the control signal generator 140, the control signal resource allocator 150 and the physical channel multiplexer 160 configure a control signal transmission unit to send the mobile stations 200A, 200B a control signal to be used by the mobiles stations 200A, 200B (multiple receivers) to cancel the non-orthogonal signals addressed to the other receivers (for example, the mobile station 200A).

The control signal resource allocator 150 allocates a radio resource block to the control signal outputted from the control signal generator 140.

The physical channel multiplexer 160 multiplexes baseband signals outputted from the hybrid orthogonal/non-orthogonal multiplexer 130 and the control signal outputted from the control signal resource allocator 150 with each other in physical channels. The signals outputted from the physical channel multiplexer 160 are subjected to IFFT and Cyclic Prefix (CP) is added to the resultant signals. Then, the signals are transmitted to the mobile stations 200A, 200B from a transmission antenna. In this embodiment, the hybrid orthogonal/non-orthogonal multiplexer 130 and the physical channel multiplexer 160 configure a radio signal transmission unit to transmit orthogonal signals and non-orthogonal signals to multiple mobile stations (receivers) located within the cell C1.

(2.2) Mobile Station 200A

As illustrated in FIG. 4, the mobile station 200A includes a physical channel segmentation unit 210, data demodulating/decoding units 220, a target user control signal detector 230 and an interfering user control signal detector 240. Note that the mobile station 200B has the same functional block configuration as the mobile station 200A.

The physical channel segmentation unit 210 receives radio signals transmitted from the base station 100, and performs segmentation of physical channels included in the radio signals. As described above, the radio signals received by the physical channel segmentation unit 210 are radio signals transmitted from the base station 100 (one transmitter) and include orthogonal signals which are orthogonal to each other and non-orthogonal signals which are not orthogonal to each other. The segmented physical channels are outputted to the data demodulating/decoding units 220, the target user control signal detector 230 and the interfering user control signal detector 240. In this embodiment, the physical channel segmentation unit 210 configures a radio signal reception unit.

There are provided multiple data demodulating/decoding units 220. Specifically, the data demodulating/decoding units 220 are provided for interfering users and a target user according to the number of signals (users) multiplexed as non-orthogonal signals. In this embodiment, since at maximum four users are multiplexed, it is preferable to also provide four data demodulating/decoding units 220.

The data demodulating/decoding units 220 each execute radio resource block extraction, interference canceller, channel estimation, demodulation/decoding and decoded data combining.

In particular, in this embodiment, the interference canceller of the data demodulating/decoding units 220 extracts the non-orthogonal signal addressed to the mobile station 200A from the multiple non-orthogonal signals by demodulating and cancelling the radio signals addressed to the other mobile stations (receivers) by use of the orthogonal signals (for example, the foregoing control information and reference signal) included in the received radio signals.

Specifically, the interference canceller demodulates and cancels the radio signals addressed to the other mobile stations (receivers) on the basis of the control signal received by the physical channel segmentation unit 210 (control signal reception unit). More specifically, the interference canceller cancels the non-orthogonal signals addressed to the other mobile stations on the basis of the control information included in the control signal detected by the target user control signal detector 230 and the interfering user control signal detectors 240.

In addition, since the maximum number of multiplexed non-orthogonal signals is known (quad multiplexing in this embodiment), the interference canceller demodulates and cancels the radio signals addressed to the other receivers within the range not exceeding the known maximum number of non-orthogonal signals. Note that the interference cancelling method will be described later.

In addition, the data demodulating/decoding unit 220 demodulates the signal included in the orthogonal signals and addressed to the mobile station 200A and the signal extracted by the interference canceller and addressed to the mobile station 200A.

The target user control signal detector 230 detects the control signal addressed to the target user, i.e., the device (mobile station 200A) itself. The target user control signal detector 230 provides the detected control signal to the data demodulating/decoding unit 220 (for the target user). Anyone or combination of the above (a) to (d) is used as the control signal.

The interfering user control signal detector 240 detects the control signals addressed to the interfering users, i.e., the other devices (for example, the mobile station 200B). As similar to the target user control signal detector 230, the interfering user control signal detector 240 provides the detected control signals to the data demodulating/decoding units 220 (for the interfering users). In this embodiment, the interfering user control signal detector 240 configures a control signal reception unit to receive the control signals to be used to cancel the non-orthogonal signals by the interference canceller.

Here, the signal processing in the interference canceller in the data demodulating/decoding units 220 is explained briefly. First, when the mobile station 200A is located at the cell edge of the cell C1 as illustrated in FIG. 1, the interference canceller cannot remove the signal of the mobile station 200B located in the center within the cell C1. For this reason, the data demodulating/decoding units 220 perform the demodulation/decoding directly. Specifically, the signal processing in the user 1 can be explained based on the following computational expression:

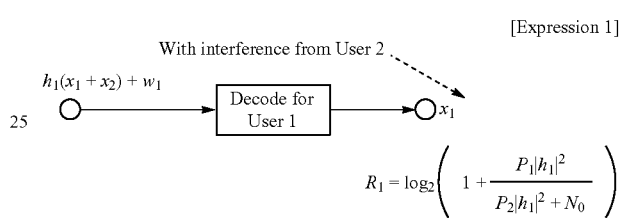

[Expression 1]

$$R_1 = \log_2\left(1 + \frac{P_1|h_1|^2}{P_2|h_1|^2 + N_0}\right)$$

Here, the user 1 denotes the mobile station 200A located at the cell edge of the cell C1, and the user 2 denotes the mobile station 200B located in the center in the cell C1. $P_1$ and $P_2$ are transmission powers of the user 1 and the user 2, and $h_1$ and $h_2$ are channel gains of the user 1 and the user 2.

As described above, in the case where the mobile station (user 1) is located at the cell edge, the received signals ($R_1$) include an interference from the mobile station (user 2) located in the cell center, but the user 1 cannot remove the interference from the user 2 because having a poorer SNR than the user 2. Hence, the user 1 executes the demodulation/decoding directly without removing the signal of the user 2.

On the other hand, the signal processing in the user 2 can be explained based on the following computational expression:

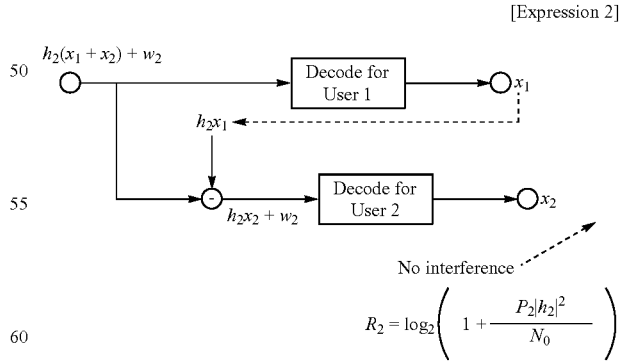

[Expression 2]

$$R_2 = \log_2\left(1 + \frac{P_2|h_2|^2}{N_0}\right)$$

As described above, in the case where the mobile station (user 2) is located at the cell center, the received signals ($R_2$) include an interference from the mobile station (user 1) located at the cell edge. Since the user 2 has a better SNR than the user 1, the user 2 removes the signal of the user 1 by decoding it once, and then demodulates/decodes the signal of the user 2 after removing the signal of the user 1.

Note that this signal processing is the same as the method described in above Non-patent document 1.

(3) Configuration Examples of Control Signals

Next, description is provided for configuration examples of control signals. Specifically, configuration examples 1 to 4 of control signals are described with reference to FIGS. 6 to 10.

(3.1) Configuration Example 1

Figure 6:
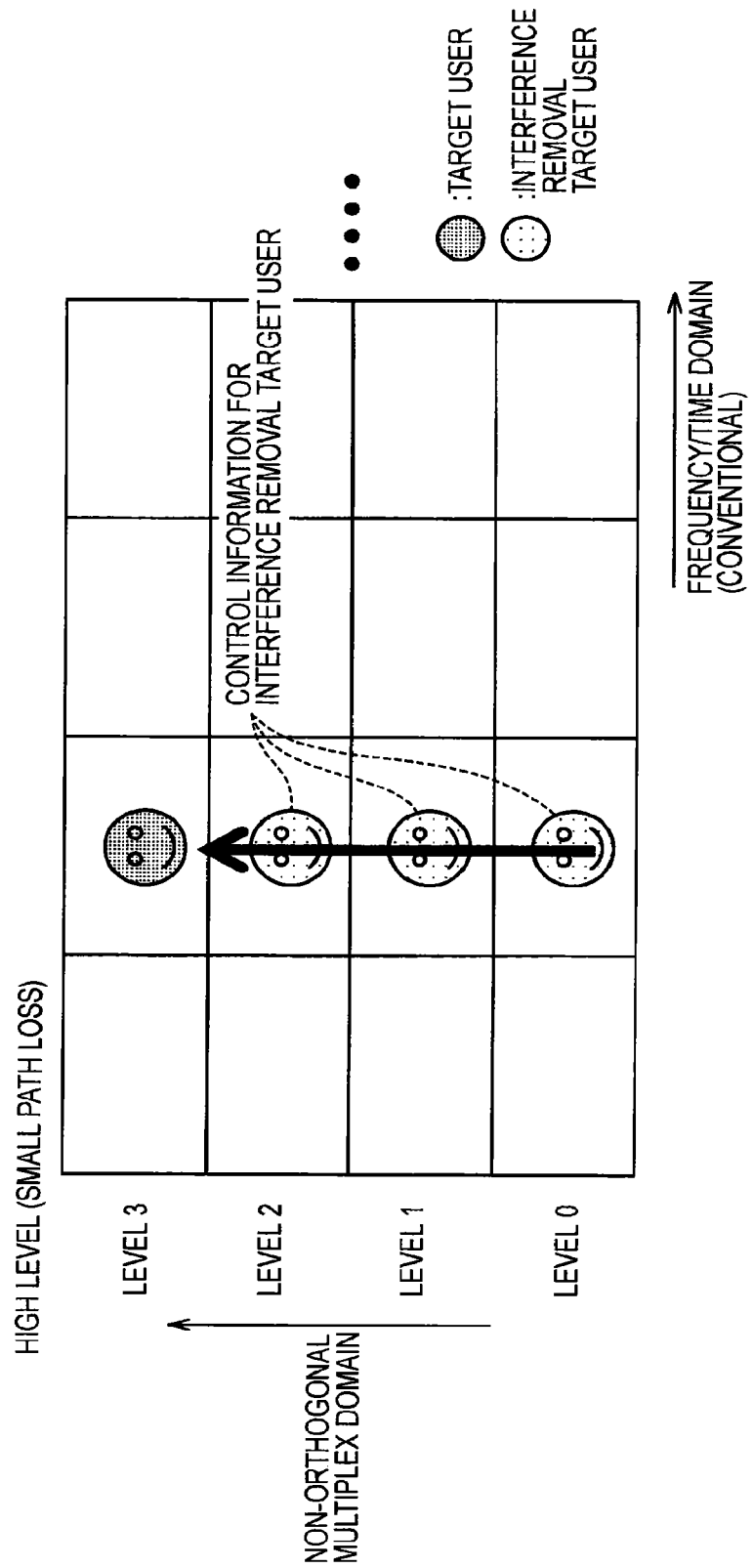
FIG. 6 is a diagram illustrating a radio resource block allocation example according to the embodiment of the present invention.

To begin with, radio resource block allocation according to this embodiment is described with reference to FIG. 6. FIG. 6 illustrates a radio resource block allocation example according to this embodiment. In this embodiment, in addition to the conventional frequency/time domain-based definitions of radio resource blocks, a radio resource domain (level) for non-orthogonal multiplexing is newly defined (hereinafter, referred to as a non-orthogonal multiplex domain). In other words, a radio resource blocks allocated to non-orthogonal signals is defined in the frequency domain, the time domain and the non-orthogonal multiplex domain.

The non-orthogonal multiplex domain has multiple levels according to the number of interference cancellations in the mobile station. Specifically, the levels are determined according to the path losses between the base station 100 and the mobile stations 200A, 200B, and a radio resource block at a higher level is allocated to the mobile station having a smaller path loss. In other words, the coding/data modulating units 110 of the base station 100 allocate, to non-orthogonal signals, a radio resource block defined in the frequency domain, the time domain and the non-orthogonal multiplex domain having the multiple levels according to the number of interference cancellations in the mobile stations 200A, 200*b*.

The mobile station 200A, 200B (user itself) removes signals of mobile stations (interference removal target users) assigned to lower levels than the mobile station itself in the non-orthogonal multiplex domain, within the radio resource block in the frequency/time domain to which the mobile station itself is assigned (an arrow in the drawing indicates the radio resource block allocated to non-orthogonal signals at low levels to be removed by a mobile station at the highest level). In short, the interference canceller of the mobile station 200A, 200B cancels the non-orthogonal signals whose allocated radio resource block is at lower levels than that of the mobile station itself.

Thus, with the definition of the non-orthogonal multiplex domain, a mobile station (user) and a radio resource block targeted for interference removal are automatically and uniquely determined based on the radio resource block allocated thereto.

Moreover, each mobile station needs to recognize information on radio resource block allocation, modulation scheme, coding rate or the like of an interference removal target user. To this end, this embodiment enables each mobile station to recognize these kinds of information by using the control signal.

FIG. 7 is a diagram illustrating a configuration example 1 of a control signal. In the configuration example 1, the control information on all the users is collectively coded. Specifically, the control information on all the users is coded by Joint coding. In the configuration example 1, the control signal generator 140 of the base station 100 sends the mobile stations 200A, 200B a control signal in which the control information on the multiple mobile stations is collectively coded.

In addition, as illustrated in FIG. 7, the control signal includes control information containing a radio resource block allocated to a non-orthogonal signal addressed to another mobile station (receiver), a modulation scheme, a transport block size (coding rate), and a transmission power ratio. Note that the transmission power ratio is a ratio between the transmission power of the non-orthogonal signal to the mobile station itself and the transmission power of the non-orthogonal signal to the other mobile station. Moreover, the control information may contain other control information and a mobile station identifier (UE ID). Then, the modulation scheme, the transport block size (coding rate), and the transmission power ratio are not necessarily essential, and the control signal does not have to include these kinds of the control information.

Further, as illustrated in FIG. 7, the control signal generator 140 may send the control signal including the levels in the non-orthogonal multiplex domain (non-orthogonal multiplex levels) within the radio resource block allocated to non-orthogonal signals addressed to multiple mobile stations. However, the non-orthogonal multiplex levels may be omitted if the non-orthogonal multiplex levels can be determined by blind demodulation or the like.

The control signal generator 140 (control signal transmission unit) may change the number of blind decodes according to the level in the non-orthogonal multiplex domain. For instance, the number of blind decodes may be increased as the level in the non-orthogonal multiplex domain becomes higher.

The mobile station 200A, 200B acquires the control information on another mobile station whose allocated radio resource block is in the same frequency domain or time domain as, but is at a lower level than that of the mobile station itself, and cancels the non-orthogonal signal to which the radio resource block at the lower level than that of the mobile station itself is allocated, by using the acquired control information.

Such control information may be mapped in ascending order (or descending order) of the level in the non-orthogonal multiplex domain. Instead, information indicting the levels may be included in the control information, and thereby the mobile station 200A, 200B may be directly notified of the levels.

(3.2) Configuration Example 2

Parts (a) and (b) of FIG. 8 are diagrams illustrating a configuration example 2 of a control signal. In the configuration example 2, the control information necessary to remove interference of an interference removal target mobile station (user) is sent as control information addressed to the user itself.

Part (a) of FIG. 8 illustrates a configuration example of a control signal addressed to a user at a low level in the non-orthogonal multiplex domain. Part (b) of FIG. 8 illustrates a configuration example of a control signal addressed to a user at a high level in the non-orthogonal multiplex domain.

As illustrated in part (b) of FIG. 8, the control signal addressed to the user at the high level (certain level) is multiplexed with the control information addressed to users at lower levels in addition to the user at the high level. On the other hand, as illustrated in part (a) of FIG. 8, the control signal addressed to the user at the low level only includes control information addressed to the user because there is no need to remove an interference from another user.

In summary, in the configuration example 2, the control signal generator 140 of the base station 100 transmits a control signal including the control information on a mobile station at a high level in the non-orthogonal multiplex domain and the control information on a mobile station at a lower level than the high level in the non-orthogonal multiplex domain.

(3.3) Configuration Example 3

FIG. 9 is a diagram illustrating a configuration example 3 of a control signal. In the configuration example 3, the control signal addressed to the user itself includes information for demodulating the control signal addressed to an interference removal target user, specifically, a user lower by one level than the user itself. To be specific, UE ID or information indicting the position of a radio resource block (for example, Control Channel Element (CCE) index, or the like) can be used.

In the case of the configuration example 3, the mobile station 200A, 200B sequentially demodulates the control signals of users at lower levels. For example, when the control information for the mobile station 200B is at the level 2, the mobile station 200B sequentially demodulates the control signals for users (for example, the mobile station 200A) at the level 1 and level 0.

In summary, in the configuration example 3, the control signal generator 140 of the base station 100 transmits a control signal in which the control information of a mobile station at a high level in the non-orthogonal multiplex domain includes the control information of another mobile station at the next lower level than the high level.

(3.4) Configuration Example 4

Parts (a) and (b) of FIG. 10 are diagrams illustrating a configuration example 4 of a control signal. The configuration example 4 is configured such that the control information for a user at a low level can be demodulated by all the users of multiplexed non-orthogonal signals. The configuration example 4 is effective in a case where the non-orthogonal multiplex domain only has two levels.

Part (a) of FIG. 10 illustrates a configuration example of a control signal addressed to a user at a high level (certain level) in the non-orthogonal multiplex domain. Part (b) of FIG. 10 illustrates a configuration example of a control signal addressed to a user at a low level in the non-orthogonal multiplex domain.

Specifically, in the configuration example 4, the control signal generator 140 of the base station 100 transmits a control signal with which multiple mobile stations (all the mobile stations) is enabled to demodulate the control information for a mobile station at a low level in the non-orthogonal multiplex domain. Here, the configuration that can be demodulated by all the mobile stations (users) is, for example, to fix the radio resource block (CCE index) where the control signal is multiplexed.

(4) Examples of Operations and Effects

In the mobile communication system 1 according to this embodiment, the control signal used to cancel the non-orthogonal signal in the mobile station 200A, 200B includes control information containing the radio resource block allocated to a non-orthogonal signal addressed to another mobile station, the modulation scheme, the transport block size, and the transmission power ratio. Hence, using the control information, the mobile station 200A, 200B can reduce a processing load for removal of multiple access interference due to use of the non-orthogonal signals, and thereby cost increase and processing delay in the mobile station or the like can be suppressed in the case where the hybrid orthogonal/non-orthogonal multiple access is introduced.

(5) Other Embodiments

Although the content of the present invention is disclosed through the embodiment of the present invention as described above, it should not be understood that the description and drawings constituting part of this disclosure limit the present invention. From this disclosure, various alternative embodiments would be obvious to those skilled in the art.

For example, in the foregoing embodiment of the present invention, the examples of downlink from the base station 100 to the mobile stations 200A, 200B are described. However, the present invention can be applied to uplink. Moreover, the present invention can be also applied to radio communications not only between the base station and mobile stations, but also between base stations.

Furthermore, the foregoing embodiments are described by taking as the example the case where the hybrid orthogonal/non-orthogonal multiple access is introduced. The application range of the present invention, however, is not limited to the hybrid orthogonal/non-orthogonal multiple access, but obviously includes any mobile communication system using non-orthogonal multiple access.

As described above, the present invention naturally includes various embodiments which are not described herein. Accordingly, the technical scope of the present invention should be determined only by the matters defining the invention in the scope of claims regarded as appropriate based on the foregoing description.

The entire contents of Japanese Patent Application No. 2011-114032 (filed on May 20, 2011) and Japanese Patent Application No. 2011-227149 (filed on Oct. 14, 2011) are incorporated herein by reference.

INDUSTRIAL APPLICABILITY

According to the features of the present invention, provided are a receiver, a transmitter, and a radio communication method capable of using non-orthogonal multiple access while suppressing cost increase and processing delay.

EXPLANATION OF THE REFERENCE NUMERALS

1 mobile communication system
100 base station
110 coding/data modulating unit
120 base station scheduler
130 hybrid orthogonal/non-orthogonal multiplexer
140 control signal generator
150 control signal resource allocator
160 physical channel multiplexer
200A, 200B mobile station
210 physical channel segmentation unit
220 data demodulating/decoding unit
230 target user control signal detector
240 interfering user control signal detector

The invention claimed is:

1. A mobile station, comprising:
a processor; and
a receiver,
wherein:
the receiver receives a radio signal from a base station device, the radio signal being a plurality of downlink signals destined to different mobile stations and which overlap each other in frequency, time, and space and the plurality of downlink signals being non-orthogonally multiplexed; and
the processor
detects a control information including information on multiple access interferences caused by the non-orthogonal multiplex, and
decodes a downlink signal destined to an own mobile station based on the control information, and wherein
the radio signal includes at least:
a downlink signal destined to the own mobile station, and
a downlink signal other than the downlink signal destined to the own mobile station, wherein the downlink signal other than the downlink signal to the own mobile station can be demodulated based on the control information, and wherein
the information on multiple access interferences indicates a modulation scheme for the downlink signal other than the downlink signal to the own mobile station, a number of multiple access interferences and a reference signal required for coherent demodulation so that the processor can demodulate the downlink signal other than the downlink signal to the own mobile station to decode the downlink signal destined to the own mobile station.

2. The mobile station according to claim 1, wherein the processor determines a transmission power ratio of the plurality of the downlink signals.

3. The mobile station according to claim 1, wherein the processor determines a position of a radio resource for a downlink signal other than a downlink signal destined to the own mobile station.

4. The mobile station according to claim 1, wherein the processor determines a modulation scheme for a downlink signal other than a downlink signal destined to the own mobile station.

5. The mobile station according to claim 1, wherein the information on multiple access interferences indicates a non-orthogonal multiplex level.

* * * * *